United States Patent [19]
Schleife et al.

[11] Patent Number: 5,716,519
[45] Date of Patent: Feb. 10, 1998

[54] APPARATUS FOR DISCHARGING FLUID ADDITIVES INTO A WATER TREATMENT VESSEL

[75] Inventors: James M. Schleife, Oswego; Donald N. Ruehrwein; John J. Fassbender, both of Batavia, all of Ill.

[73] Assignee: Chicago Bridge & Iron Technical Services Company, Oak Brook, Ill.

[21] Appl. No.: 628,787

[22] Filed: Apr. 5, 1996

[51] Int. Cl.[6] .................................................. C02F 1/52
[52] U.S. Cl. ...................... 210/206; 210/207; 210/220; 210/519
[58] Field of Search ..................... 210/198.1, 199, 210/205, 206–209, 220, 519, 520, 531

[56] References Cited

U.S. PATENT DOCUMENTS

| | | | |
|---|---|---|---|
| 1,408,154 | 2/1922 | Allen | 210/209 |
| 2,245,589 | 6/1941 | Hughes | 210/715 |
| 2,257,362 | 9/1941 | Zitkowski | 422/261 |
| 4,146,471 | 3/1979 | Wyness | 210/20 |
| 4,265,753 | 5/1981 | Manuel | 210/207 |
| 4,357,242 | 11/1982 | Chandler | 210/207 |
| 4,367,141 | 1/1983 | Dörömbözi et al. | 210/520 |
| 4,603,000 | 7/1986 | Casey | 210/207 |
| 4,765,891 | 8/1988 | Wyness | 210/207 |
| 5,059,358 | 10/1991 | Tharp | 261/122 |

*Primary Examiner*—Peter A. Hruskoci
*Attorney, Agent, or Firm*—Marshall, O'Toole, Gerstein, Murray & Borun

[57] ABSTRACT

Apparatus for discharging an additive into water in a treatment vessel comprises discharging means and means for feeding the additive to the discharging means. The discharging means may comprise a pipe, a nozzle, or a header conduit having a number of outlets. A method for discharging an additive into water in a treatment vessel includes the steps of adjusting the elevation of an outlet in a conduit relative to the treatment vessel and discharging the additive from the outlet in the conduit into water in the treatment vessel.

19 Claims, 8 Drawing Sheets

APPARATUS FOR DISCHARGING FLUID ADDITIVES INTO A WATER TREATMENT VESSEL

The present invention is generally directed to apparatus and methods for treating water or wastewater in a treatment vessel. More particularly, the present invention is directed to apparatus and methods for discharging fluid additives into water or wastewater in a solids contact precipitation or solids contact clarification vessel.

BACKGROUND OF THE INVENTION

Treatment of water and other liquids is often performed in solids contact precipitation or solids contact clarification vessels. In one variety of such vessels, a helical flow vessel, a portion of the vessel is conically shaped. Untreated water is flowed helically from the bottom or smaller diameter end of the conical section of the vessel. As the water rises from the smaller diameter end of the conical section, the upward velocity of the water decreases. Eventually, the flow of the water slows down to a rate at which sediment and other impurities cannot be maintained in suspension and begin to settle. The particular height and upward velocity in the clarifying vessel at which settling occurs varies depending on, among other parameters, the temperature of water to be treated, and the density of the particulates removed. Below a certain upward velocity, nearly all the particulates settle. Thus, at or below the critical upward velocity, a blanket of sludge forms from the accumulating solids.

Just below the top surface of the sludge blanket, or sludge separation line, there is a solids concentrator for collecting the sludge and removing it from the vessel. The solids concentrator is often shaped as a cone and is capable of vertical movement so that its location can be adjusted in response to varying water treatment conditions. Vertical movement of the solids concentrator can also be used to change the vertical location of the top surface of the sludge blanket. For example, by lowering the concentrator below the sludge separation line, one can remove much of the sludge above the top of the concentrator. By raising the concentrator above the separation line, one can accumulate solids to increase the volume and density of solids in the clarifier, enhancing treatment. By continuous removal of sludge from the solids concentrator at a controlled rate, or intermittent removal of sludge from the solids concentrator for controlled durations, the top elevation of the sludge blanket can be limited within some range above the top elevation of the solids concentrator.

A function of the sludge blanket is to enhance the capture of solids from water rising through the blanket by enmeshment as well as by providing "sites" for agglomeration, permitting settling at reasonable velocities. Dissolved solids which are being precipitated in the clarifying vessel will precipitate at faster rates, with lower amounts of treatment chemicals and will form larger, faster settling particles because of the exposure to high concentrations of previously precipitated solids that are present in the sludge blanket. Similarly, fine particulate matter will flocculate and form larger, faster settling particles and be more effectively removed from the flow due to the contact with previously flocculated particles in the sludge blanket.

As the water passes upwardly through the blanket, solids in the water not only tend to settle out, but become trapped in the sludge in the blanket as well. Chemicals such as flocculating agents can be added to the water at some point in the treatment scheme before the clarifying vessel or within the clarifying vessel below or within the sludge blanket to enhance this filtering effect so that after water rises above the sludge blanket, the water has fewer impurities than it had below the sludge blanket.

In addition to flocculating agents, other additives may be required to condition water that has risen above the sludge blanket prior to that water passing through subsequent, remote filters. Typically, such additives are added to the water after the water is removed from the treatment vessel which requires both extra capital and extra contact time so that the additives have adequate opportunity to react with the water.

In water treatment facilities in which additives, such as filtration aids (e.g., flocculating agents) for filter conditioning, pH adjusting chemicals, and/or disinfectants are added to the water in the treatment vessel above the sludge, the devices for discharging the additive are typically fixed at one location and may require extensive piping and a multitude of diffusers, creating a complex and costly apparatus. In a treatment vessel having a sludge blanket that can rise and fall, stationary discharging devices are not versatile enough to optimize the use of the additives. For example, if a filtration aid is discharged into the vessel too far below the top of the sludge blanket, portions of the filtration aid will be consumed within the sludge blanket and, subsequently, be removed from the treatment vessel without imparting any benefit to the water that is to be filtered.

With disinfectants, such as chlorine, the location of discharge into the treatment vessel can be even more significant. First, in order to minimize the concentration of harmful disinfection by-products, such as trihalomethanes (THMs), that form when the disinfectant contacts and reacts with organic substances in the sludge blanket, the disinfectant must be discharged above the sludge blanket. By controlling the position at which disinfectant discharge occurs, compliance with governmental drinking water regulations concerning disinfection by-product levels can be facilitated.

Second, in order to maximize the contact time between the disinfectant and the water, the discharge location should be as close to the top of the sludge blanket as possible. Contact time is then maximized, because nearly the entire time that the water spends flowing above the sludge blanket prior to exiting the vessel is spent in contact with the disinfectant.

Governmental regulations for the treatment of drinking water require specific values of disinfectant Ct, where Ct is the mathematical product of C (the disinfectant concentration) and t (the contact time between the disinfectant and the water). To meet those regulations, when using a typical treatment vessel in a water purification process, water must spend time in intermediate treatment facilities, such as tanks, following treatment in the treatment vessel. The intermediate water treatment is an extra capital cost and an extra operating cost.

Also, the disinfectant concentration C may be relatively high in the intermediate treatment facilities to compensate for the relatively short contact time t. Contact time t may be short because contact either occurs only outside of the treatment vessel (during supplemental water treatment) or because the contact time in the treatment vessel is unable to be fully utilized.

In water softening plants, the pH in the treatment vessel is elevated to a high level (10–11) to precipitate mineral hardness, thus generating solids. $CO_2$, $H_2SO_4$ or another acid must then be added to the water after the water has passed above the sludge to reduce the pH level of the water (to 8-9), stabilizing the pH level of the water prior to passing through the filters. Without this pH adjustment step, the precipitation reactions can continue at the elevated pH levels, creating filter media cementation and other problems. Some pH adjusting chemicals require a significant amount of time in contact with the water before the reaction is substantially complete. Because of the short contact time that would be attainable in a typical treatment vessel with a fixed chemical discharge structure, and due to inefficient contact from a lack of helical flow which creates good mixing and contact, an intermediate tank between the treatment vessel and the filters is sometimes necessary for adding certain pH adjusting chemicals prior to filtering. The intermediate tank increases the overall cost of purification. Also, should the fixed acid discharge structure be submerged in the blanket, the acid would redissolve the mineral hardness just precipitated, defeating the purpose of the treatment vessel.

In the case of surface water such as a river, lake or reservoir having a high concentration of suspended solids, coagulants and/or flocculants such as alum or polymers are added in the treatment vessel, below the blanket, to coagulate, flocculate and remove the solids. The coagulating agents may depress the pH, often to a corrosive level. To raise the pH to a safe level, lime, sodium hydroxide or other basic chemicals are added to the water in an intermediate tank between the clarifier and the filters or in a pipeline. Again, the intermediate tank raises the cost of purification. The pipeline addition, however, provides minimal contact time.

Thus, there is a need for discharging apparatus and methods to control the discharge elevation of filtration aiding agents, disinfectant, and other additives into clarifying vessels. In particular, there is a need to control the location, rate, and direction of discharge.

SUMMARY OF THE INVENTION

In accordance with the present invention there is provided an apparatus for discharging an additive into water in a helical flow treatment vessel having a solids concentrator disposed therein. The apparatus includes: a discharging means having an inlet for receiving additive and means for emitting additive; mounting means for mounting the discharging means for movement with respect to a sludge blanket within the treatment vessel; and means for feeding the additive to the inlet of the discharging means.

The mounting means may be connected to the solids concentrator for vertical movement therewith. The mounting means may be connected to the solids concentrator and may include means for adjusting the vertical distance between the solids concentrator and the discharging means.

The means for emitting additive may comprise a nozzle, a header conduit with a plurality of outlets, a pipe having an outlet, branched pipe in which each branch has an outlet, a membrane diffuser, or a porous tube diffuser.

The means for feeding additive to the inlet of the discharging means may include means for adjusting the flow rate of additive to match changes in the flow rate of the water being treated or to match changing treatment conditions. Changes in the strength of the additive solution may be required to control the required additive solution flow rate to prevent disruption of water flow in the vessel. This may be necessary as the discharging means is moved vertically through the vessel and encounters liquid at various velocities.

The discharging means may discharge the additive in a direction substantially parallel to the flow direction of water adjacent the means for emitting additive.

An alternative apparatus for discharging an additive into water in a treatment vessel having a vertically adjustable solids concentrator disposed therein comprises a discharging means having an inlet for receiving additive and means for emitting additive. The discharging means is joined to the solids concentrator for movement therewith as conditions require. Means for feeding additive to the inlet of the discharging means is also provided.

The apparatus may further include means for adjusting the vertical distance between the discharging means and the solids concentrator.

The means for emitting additive may comprise any of the following alternative structures: a nozzle, a header conduit with a plurality of outlets, a pipe having an outlet, branched pipe in which each branch has an outlet, a membrane diffuser, or a porous tube diffuser.

The means for feeding additive to the inlet of the discharging means may include means for adjusting the flow rate of additive to match changes in the flow rate of the water being treated or to match changing treatment conditions. Changes in the strength of the additive solution may be required to control the required additive solution flow rate to prevent disruption of water flow in the vessel.

The discharging means may discharge the additive in a direction substantially parallel to the flow direction of water adjacent the means for emitting additive.

There is also provided in accordance with the present invention a method for discharging an additive into water in a treatment vessel having a vertically adjustable solids concentrator disposed therein. The method comprises the steps of: adjusting the elevation of an outlet in a conduit relative to the sludge level in the treatment vessel; and discharging additive from the outlet in the conduit into water in the treatment vessel.

The step of adjusting the elevation of an outlet in a conduit relative to the sludge level in the treatment vessel may include mounting the conduit on the solids concentrator and adjusting the elevation of the solids concentrator.

The step of discharging additive may include the step of directing the additive in a direction substantially parallel to the flow direction of water adjacent the outlet of the conduit. Additionally or alternatively, the step of discharging additive may include the step of controlling the flow rate of the additive to match changes in the flow rate of the water being treated or to match changing treatment conditions. Changes in the strength of the additive solution may be required to control the required additive solution flow rate to prevent disruption of water flow in the vessel.

The method may further comprise the step of providing a plurality of pipe branches, each pipe branch having an outlet for discharging additive.

The step of discharging additive may further include the step of discharging additive from any of the following structures: a porous diffuser conduit, a conduit comprising a nozzle, and a conduit comprising a header conduit having a plurality of outlets.

The method may further comprise the step of adjusting the elevation of the conduit outlet relative to the solids concentrator.

DETAILED DESCRIPTION OF THE DRAWINGS

To the extent it is reasonable and practical, the same or similar elements which appear in the various views of the drawings will be identified by the same numbers.

Figure 1:
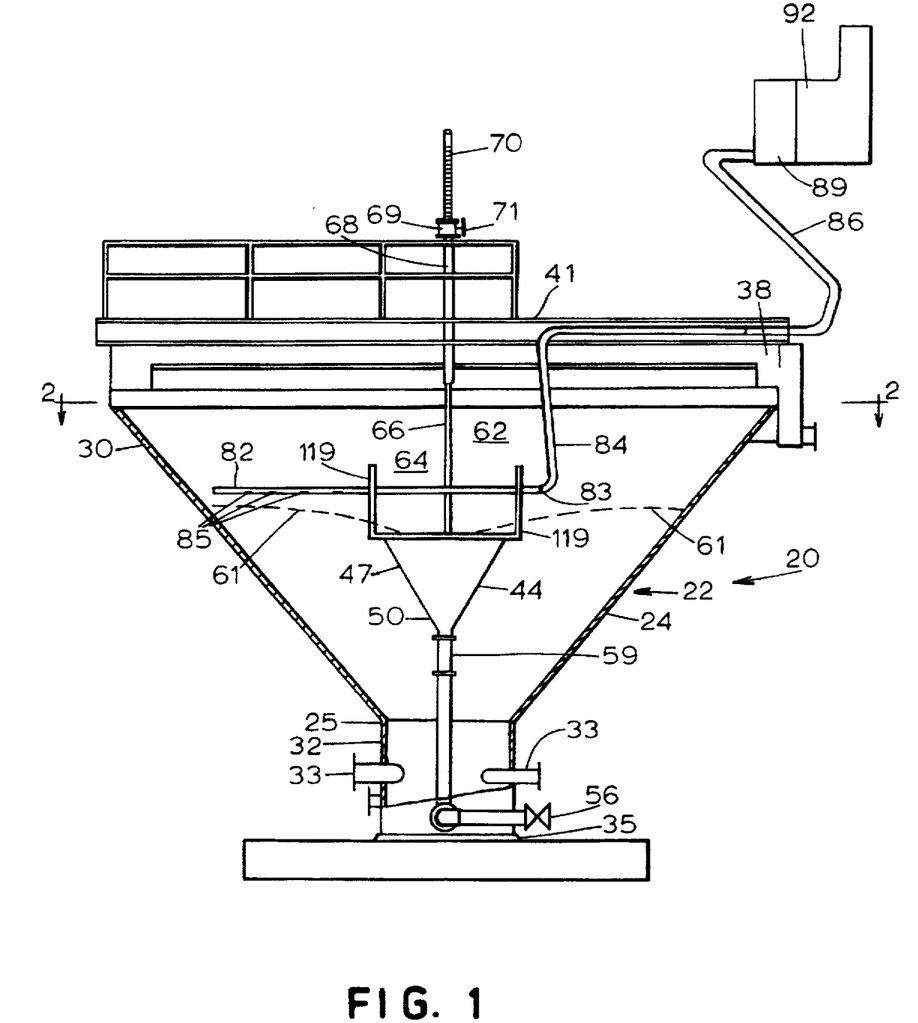
FIG. 1 is a cross-sectional view of a treatment vessel having a discharge structure in accordance with the present invention, taken along the lines 1—1 of FIG. 2.
Figure 2:
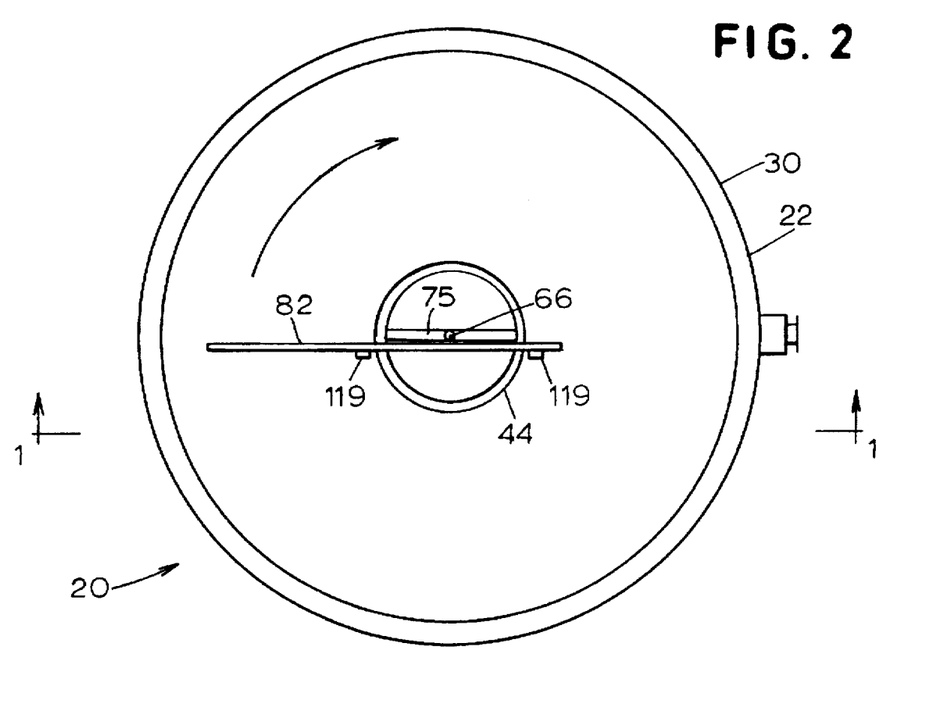
FIG. 2 is a cross-sectional view of the treatment vessel of FIG. 1 taken along the lines 2—2 of FIG. 1.

With reference to FIGS. 1 and 2, a water treatment system 20 is shown in which water is treated. The treatment system 20 has a treatment vessel 22 having walls 24 in the form of a frustum of a cone with a minimum diameter located at a bottom portion 25 and a maximum diameter located at or near an upper portion 30. Attached to the bottom portion 25 of the cone is a cylindrical inlet chamber 32 having opposing tangential inlets 33 for receiving raw water from a conduit (not shown). The cylindrical chamber 32 is joined at its lower edge to a bottom 35. Alternatively, a single tangential inlet 33 may be disposed in the chamber 32 for receiving raw water from a conduit.

An outlet 38 is located adjacent the top portion 30 of the vessel 22. A bridge 41 may extend across the top portion 30 of the vessel 22.

A solids concentrator 44 is disposed in the vessel 22. The concentrator 44 is shaped as a hollow cone having a wide end 47 and a narrow end 50 and is disposed with the narrow end 50 below the wide end 47. A valve 56 is connected to a pipe 59 attached to the bottom end of the narrow end 50 of the concentrator 44.

During water treatment, the raw water rises in a generally helical path out the cylindrical inlet chamber 32 into the conical section of the vessel 22. As the water rises through the conical section of the vessel 22, the cross-sectional area of the vessel 22 increases, resulting in a corresponding decrease in the upward velocity of the treated water through the vessel, although the net flow remains constant. The upward velocity decreases until the solids are no longer carried by the drag or lift and turbulence of the water, and at that point the lifting force of the water and the counteracting gravitational force on the suspended solids are in equilibrium, causing a suspended rotating sludge blanket 61 of the solids to form in the vessel 22. The rotating sludge blanket 61 is suspended at or below the maximum diameter of the vessel 22.

The water continues to flow vertically through the rotating sludge blanket 61, leaving most of the precipitated or suspended solids behind but forming a layer of water 62 above the blanket 61. The water layer 62 contains some suspended particles and additional particles or flocs can form by reaction with treatment chemicals in the water. These solids ultimately move into a quiescent zone 64 and are removed through wide end 47 of the concentrator 44. The valve 56, located at a level below the narrow end 50 of the concentrator 44, is opened periodically to allow sludge to flow down the pipe 59 attached to the bottom end of narrow end 50 and out of the treatment vessel 22. Although described above as a cone, the solids concentrator 44 may be any shape suitable for collecting sludge from the sludge blanket 61, such as a cylinder.

The bridge 41 facilitates access to the solids concentrator 44 and supports the solids concentrator 44. Additionally, the bridge 41 allows observation of the sludge blanket 61 and water within the treatment vessel 22.

Attached to the concentrator 44 is structure for raising and lowering the concentrator 44. Still referring to FIG. 1, structure for moving the concentrator 44 vertically includes a vertical hanger 66 fixed to the concentrator 44 and extending upwardly through a sleeve 68 connected to the bridge 41. A housing 69 disposed atop the sleeve 68 houses a gear assembly (not shown), such as a rack and pinion. A threaded upper portion 70 of the vertical hanger 66 also extends through the housing 69. A hand wheel 71, when turned by an operator, rotates the gear assembly (not shown) in the housing 69, engaging the threaded portion 70 of the vertical hanger 66, thereby raising or lowering the solids concentrator 44. The vertical hanger 66 may be stopped to maintain the solids concentrator 44 at a particular vertical elevation in the vessel 22. The vertical hanger 66 may be attached by any suitable fastening means to the concentrator 44. A hand crank, a motor operated gear drive or other suitable means may be used instead of the hand wheel 71 to raise and lower the solids concentrator 44.

Figure 3:
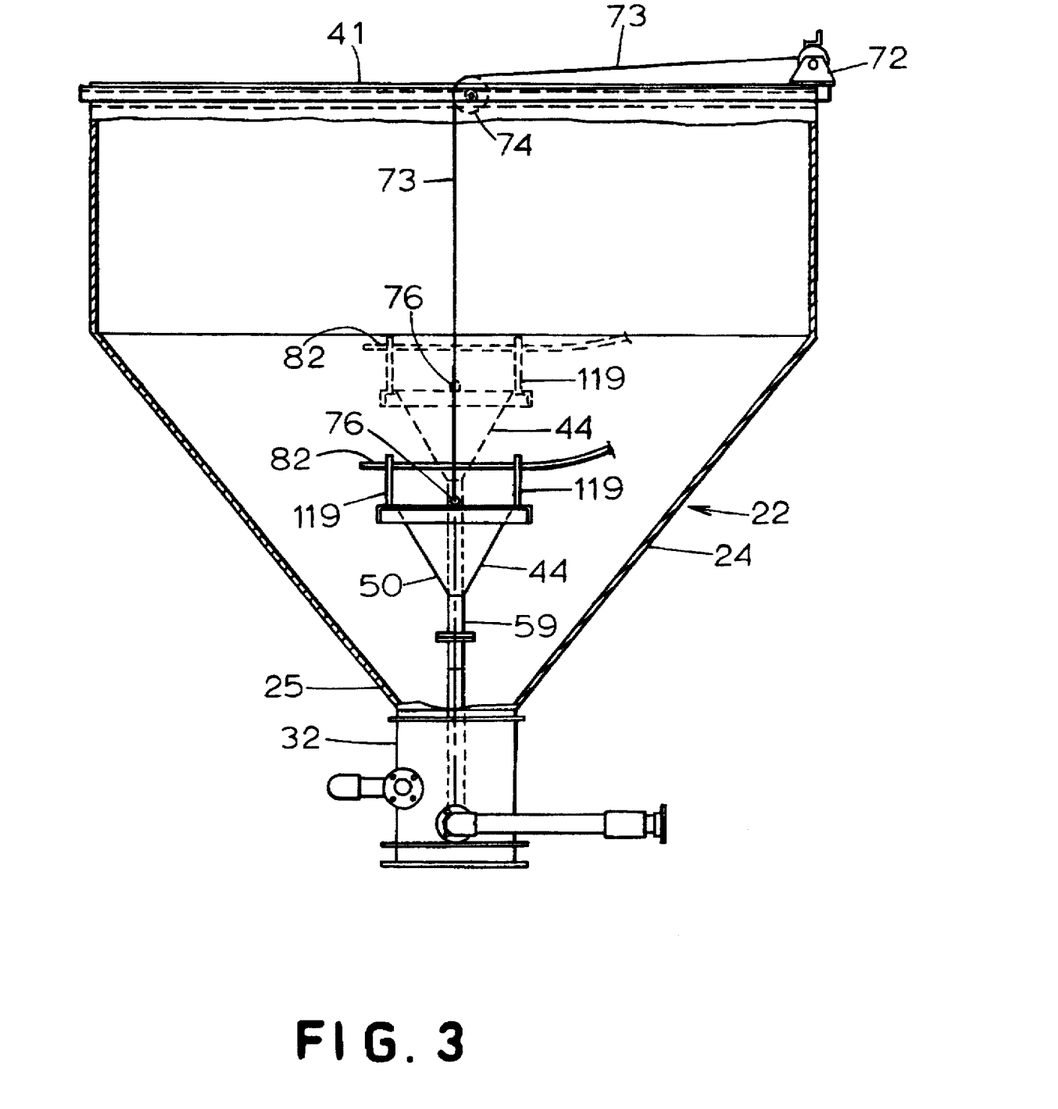
FIG. 3 is a cross-sectional view similar to FIG. 1 of a different embodiment of the present invention illustrating a solids concentrator in two different positions.

Illustrated in FIG. 3 is another structure for raising or lowering the concentrator 44. A winch 72 has a cable 73 extending over a pulley 74 mounted on the bridge 41. A support member 75 (FIG. 2) extends across the top of the concentrator 44. An eye bolt 76 is fixed to the support member 75 above the center of the concentrator 44. The cable 73 removably attaches to the eye bolt 76. When the cable 73 is attached to the eye bolt 76, the winch 72 can raise or lower the concentrator 44. Alternatively, the cable 73 may extend over a support beam, instead of the pulley 74.

Figure 4:
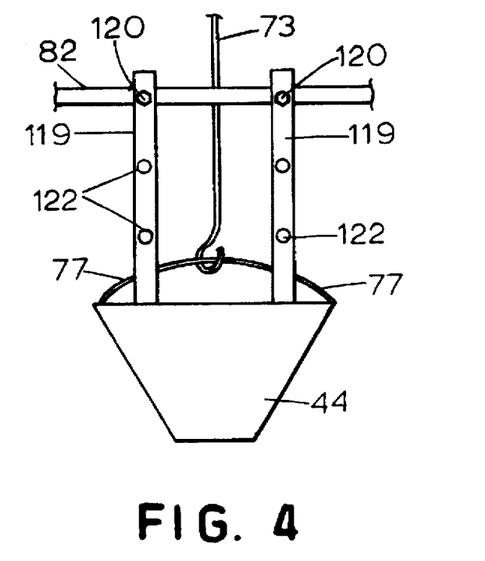
FIG. 4 is a fragmentary elevational view of an alternative embodiment in accordance with the present invention.
Figure 5:
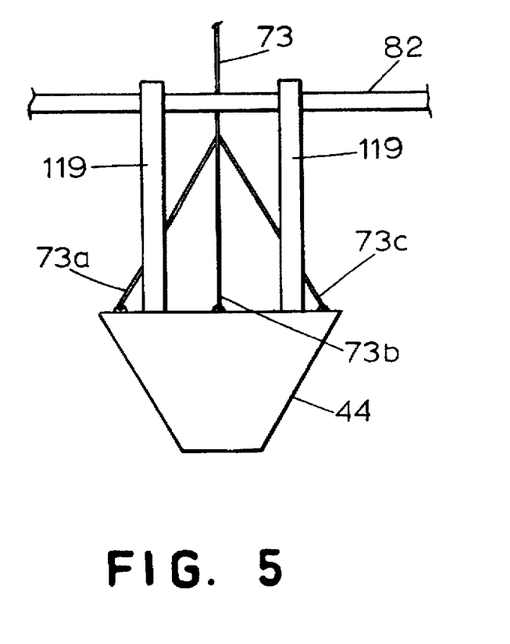
FIG. 5 is a fragmentary elevational view similar to FIG. 4 of an alternative embodiment in accordance with the present invention.

Alternatively, as shown in FIG. 4, a support cable 77 may extend across the top of the concentrator 44, replacing the support member 75. The support cable 77 may be attached to the cable 73 for raising or lowering the concentrator 44 when the winch 72 (FIG. 3) is operated. In FIG. 5 is shown a further embodiment for raising and lowering the concentrator 44. In this embodiment, the cable 73 separates into three lower cable portions 73a, 73b, and 73c. The lower cable portions 73a, 73b and 73c are individually attached to the concentrator 44, each portion at a different location on the concentrator 44 so that an equilateral triangle is formed. In this embodiment, the lower cable portions 73a, 73b and 73c are raised or lowered when the winch 72 (FIG. 3) is operated, thereby raising or lowering the concentrator 44.

Structure for raising and lowering the concentrator 44 is included, because during treatment vessel operation the vertical position of the concentrator 44 may need to be changed. The concentrator 44 may need to be raised when, for example, the sludge blanket 61 rises. Likewise, the concentrator 44 may need to be lowered when the sludge blanket 61 lowers. Variables affecting the height of the sludge blanket 61 include water flow rate, water temperature, the density of the solids in the water, the quantity of the solids in the water, and the vertical location of the solids concentrator 44.

One or more inlets can be provided for introducing water treatment chemicals, such as filtration aid or pH adjusting agents. Structure for discharging water treatment chemicals into the treatment vessel 22 is disposed in the treatment vessel 22 and may include, as illustrated in FIG. 1, one or more pipes 82 having an inlet 83 for receiving additive attached to a flexible conduit 84, such as a hose, and one or more outlets 85 for emitting additive. The outlets 85 are disposed at an elevation above the concentrator 44 and at an elevation below the treatment vessel outlet 38. The pipe 82 may be as long as will fit into the vessel 22, taking into account the decreasing radius of the vessel 22 at lower locations. The pipe 82 may be rigid or flexible.

The flexible conduit 84 is attached to the bridge 41 and runs down to the inlet 83 of the pipe 82. A pipe 86 in fluid communication with the flexible conduit 84 and attached to the bridge 41 extends to a pump 89 or any other suitable feeding means for controlling the flow of additive to the pipe 82. The pump 89 is connected to a reservoir 92 of additive and may be remote from the treatment vessel 22.

To feed fluid additives such as disinfectant or filtration aid into the vessel 22 the additive is preferably pumped through the pipe 86, and through the flexible conduit 84. The additive then flows through the pipe 82 having the outlets 85, and into the water layer 62.

Examples of disinfectants include chlorine, chlorine dioxide, chloramines, and ozone. Agents for depressing pH include $CO_2$ and $H_2SO_4$. Agents for raising pH include lime solutions and caustic soda. An example of a sequestering agent is sodium hexamata phosphate. Filtration aids include natural and synthetic polyelectrolytes.

Figure 6:
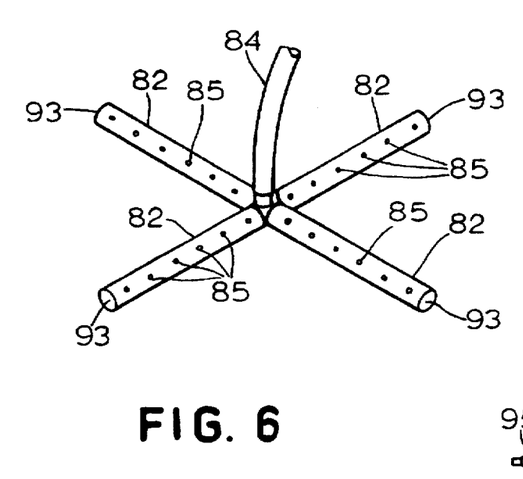
FIG. 6 is a perspective view of an alternate embodiment of discharging structure in accordance with the present invention.
Figure 7:
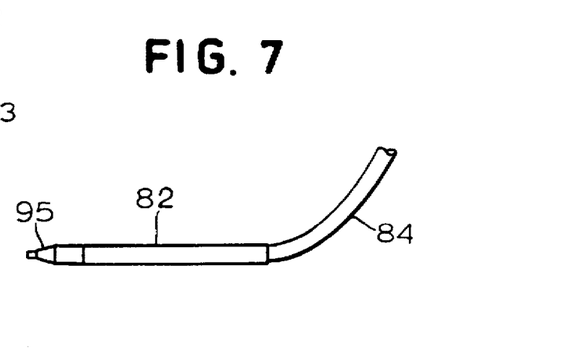
FIG. 7 is a perspective view of a second alternate embodiment of discharging structure in accordance with the present invention.
Figure 8:
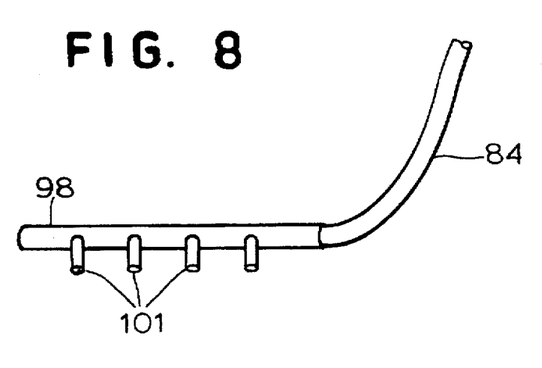
FIG. 8 is a perspective view of a third alternate embodiment of discharging structure in accordance with the present invention.
Figure 9:
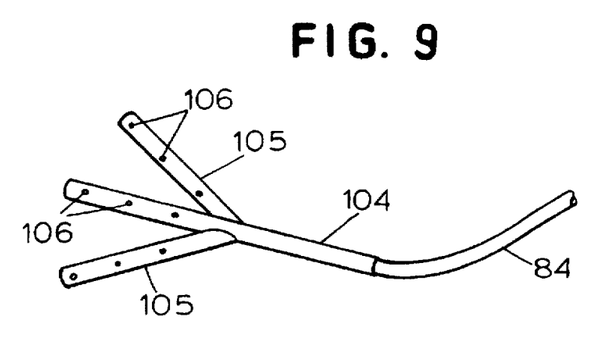
FIG. 9 is a perspective view of a fourth alternate embodiment of discharging structure in accordance with the present invention.
Figure 10:
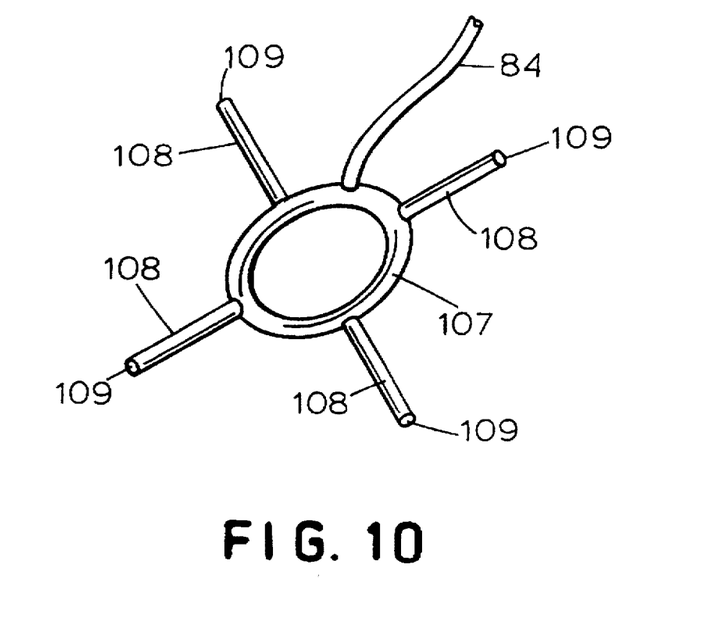
FIG. 10 is a perspective view of a fifth alternate embodiment of discharging structure in accordance with the present invention.

Alternatively, as seen in FIG. 6, the structure for discharging fluid additives into the water may include a plurality of pipes 82 radiating from the flexible conduit 84 and having outlets 93 at the ends of the pipes 82 for emitting additive or having the outlets 85 along substantially the entire length of the pipes 82 for more uniform distribution of treatment chemicals, for larger treatment vessels, or both of the outlets 85 and 93. Additionally or alternatively, the discharging structure in FIG. 7 includes one or more nozzles 95 for emitting additives connected to the pipe 82. The discharging structure may instead include, as seen in FIG. 8, a header conduit 98, with a plurality of outlets 101 for emitting additive, connected to the flexible conduit 84. Alternatively, the discharging structure may include a pipe 104 connected to the flexible conduit 84 and having branches 105, each including a plurality of outlets 106 for emitting additive, extending in a horizontal plane, as seen in FIG. 9. As seen in FIG. 10, a circular pipe 107 connected to the flexible conduit 84 has tubes 108 extending radially therefrom. The tubes 108 have outlets 109 for emitting additive. The pipe 107 may be shapes other than a circle.

Figure 11:
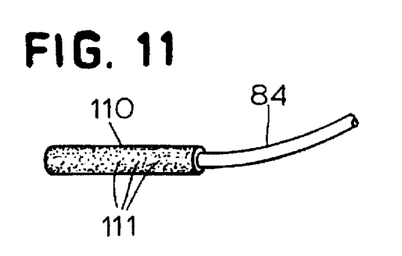
FIG. 11 is a perspective view of a sixth alternate embodiment of discharging structure in accordance with the present invention.
Figure 12:
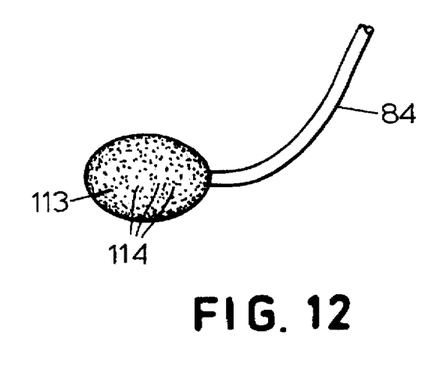
FIG. 12 is a perspective view of a seventh alternate embodiment of discharging structure in accordance with the present invention.

Two other discharging structures are a porous tube diffuser 110 having pores 111 for emitting additive (FIG. 11) and a porous membrane 113 having pores 114 for emitting additive (FIG. 12), either of which may be connected to the flexible conduit 84. The porous tube diffuser 110 may be composed of ceramic (e.g., porous $FeO_2$) or sintered fused plastic.

Because the vertical position of the sludge blanket 61 may change during operation of the clarifying vessel 22, the pipe 82 is connected to structure for mounting the pipe 82 for movement with respect to the treatment vessel 22. This improves the effectiveness of additives such as filtration aids and disinfectants. The effectiveness of such additives is related to the location of discharge of the additives with respect to the sludge blanket 61, as discussed in more detail below.

Figure 13:
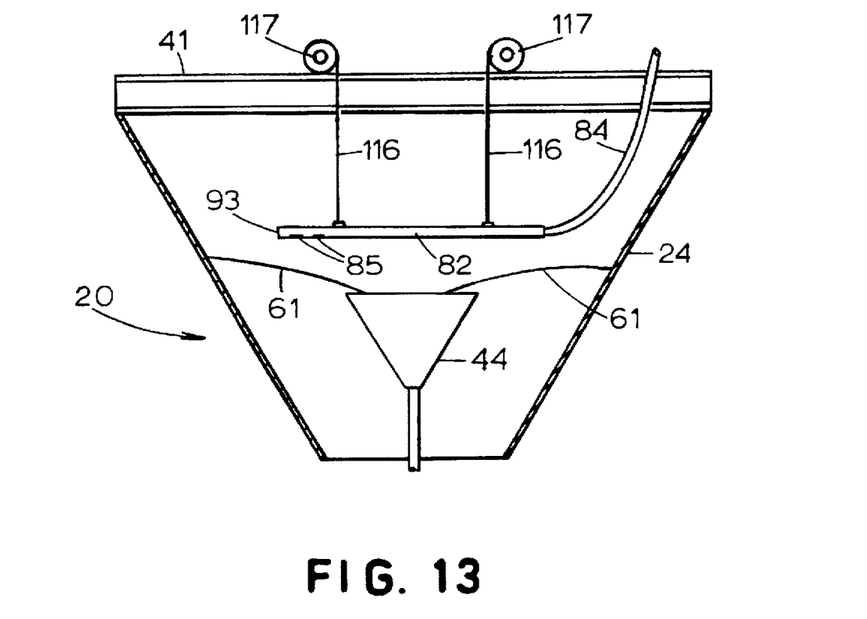
FIG. 13 is a cross-sectional view similar to FIG. 1 of an alternative embodiment in accordance with the present invention.

Referring to FIG. 13, the structure for mounting the pipe 82 for movement relative to the treatment vessel 22 may include two or more cables 116 attached to the pipe 82 and extending upwardly to the bridge 41. The cables 116 suspend the pipe 82 and the cables 116 can be raised or lowered manually or by winches 117 from the bridge 41 to move the pipe 82 vertically, thereby raising or lowering the outlets 85 and the outlet 93. The concentrator 44 of FIG. 13 can be modified for vertical movement by adding features such as the vertical hanger 66 attached to the concentrator 44 shown in FIG. 1.

Figure 14:
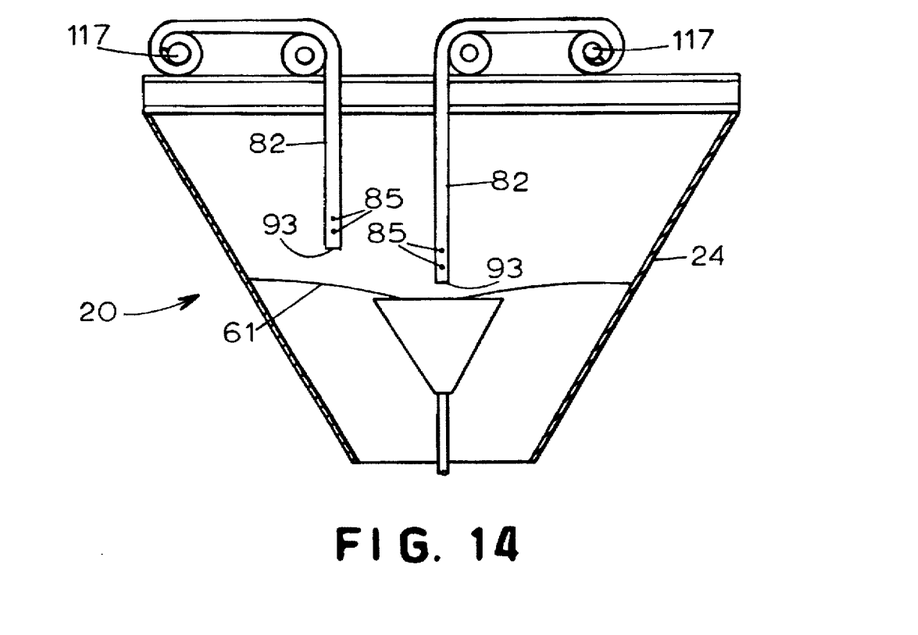
FIG. 14 is a cross-sectional view similar to FIG. 1 of an alternative embodiment in accordance with the present invention.

Alternatively, as seen in FIG. 14, the pipe 82 may be flexible and may extend downwardly from the bridge 41 without supports such as the cables 116. In this embodiment, the pipe 82 can be moved relative to the clarifying vessel 22 by lifting or lowering the pipe 82, thereby lifting or lowering the outlets 85 and the outlet 93. Lifting and lowering of the pipe 82 can be accomplished manually or by operation of the winches 117. As shown by the two pipes 82 in FIG. 14, the pipes 82 may be located at various radial positions within the vessel 22.

Further, the mounting structure preferably attaches the pipe 82 to the concentrator 44 for movement with the concentrator 44. The concentrator 44 is periodically moved vertically to follow the blanket 61 or to adjust the height of the blanket 61. By mounting the pipe 82 for movement with the concentrator 44, the pipe 82 is automatically maintained at a desired distance above the blanket 61 when the concentrator 44 is moved vertically with the blanket 61.

Referring again to FIG. 1, the pipe 82 is mounted for movement with the concentrator 44 by two rods 119 extending upwardly from the concentrator 44 and having welds, brackets, threadable fasteners, or other suitable fastening means connecting the rods 119 to the pipe 82.

When the pipe 82 is mounted for movement with the concentrator 44, the distance between the outlets 85 in the pipe 82 and the sludge blanket 61 is maintained at an effective and constant distance for discharging fluid additives. For some additives, such as disinfectant and filtration aid, an effective distance is above and adjacent the sludge blanket 61.

By being discharged above and adjacent the sludge blanket 61, contact with the sludge blanket 61 is avoided while the contact time of the additives with the treated water is maximized. In the case of chlorine, contact with the sludge blanket should be avoided to minimize the production of undesirable disinfection by-products.

Contact time with the treated water should be maximized because it may avoid the need for higher dosages of the chemicals or some subsequent processing steps. Water located low in the vessel 22 spends more time in the vessel 22, prior to exiting, than water located high in the vessel 22. Thus, additives requiring high contact times should be discharged as low as possible in the treatment vessel 22 and, if the additives react with the substances in the sludge blanket 61, the additives should be discharged above the sludge without contacting (and reacting with) the sludge. By maximizing contact times in the vessel 22, it may be possible to avoid treating the water in an intermediate tank prior to filtering the water or at least reduce the size of the intermediate tank or containment time in the intermediate tank. Additionally or alternatively, it may be possible to reduce the concentration of the additive in the vessel 22 because the additive is added to the water at an optimal location.

When flow is introduced to the treatment vessel 22 after having been without flow, the blanket 61 has a less uniform profile than after operating for some time. During start-up, the concentrator 44 may be raised higher in the treatment vessel 22 than usual to raise the pipe 82 safely above the sludge. The concentrator 44 may be lowered to its usual elevation in the vessel 22 when the blanket 61 achieves a more steady state.

The alternative discharge structures, including those structures shown in FIGS. 6–12, can also be connected to the concentrator 44 for movement therewith. Preferably, the alternative discharge structures are attached to the rods 119 and extend radially outwardly therefrom. When attached in this manner, the alternative discharge structures achieve the same advantages discussed above in connection with the embodiment having the pipe 82 including the outlets 85, shown in FIGS. 1 and 2.

In a more preferred embodiment, the pipe 82 is mounted to the concentrator 44 for vertical movement relative to the concentrator 44. This may be accomplished, as seen in FIG. 4, by bores 122 at various heights on the vertical rods 119 to accommodate bolts 120 or other suitable fastening devices. In order to adjust the distance between the pipe 82 and the concentrator 44, an operator fastens the pipe 82 to the vertical rods 119 through different bores 122.

Figure 15:
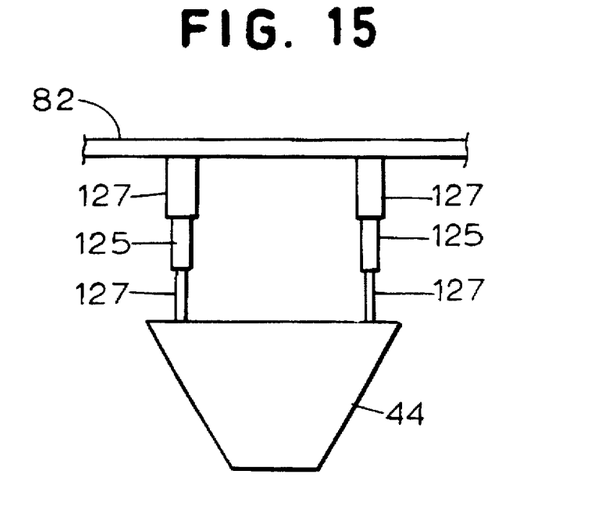
FIG. 15 is a fragmentary elevational view of an embodiment of a discharging structure in accordance with the present invention.

Alternatively, as seen in FIG. 15, the rods 119 may be replaced by adjustable hangers 125 having lengths adjustable by telescoping means to change the distance between the pipe 82 and the concentrator 44. The adjustable hangers 125 include telescoping tubes 127. Friction between adjacent telescoping tubes 127 maintains a constant distance between the pipe 82 and the concentrator 44 when an operator is not applying vertical force to the pipe 82. By pressing down on the pipe 82 or lifting up on the pipe 82, the distance between the pipe 82 and the concentrator 44 can be changed as the adjustable hangers 125 either contract or extend.

Figure 16:
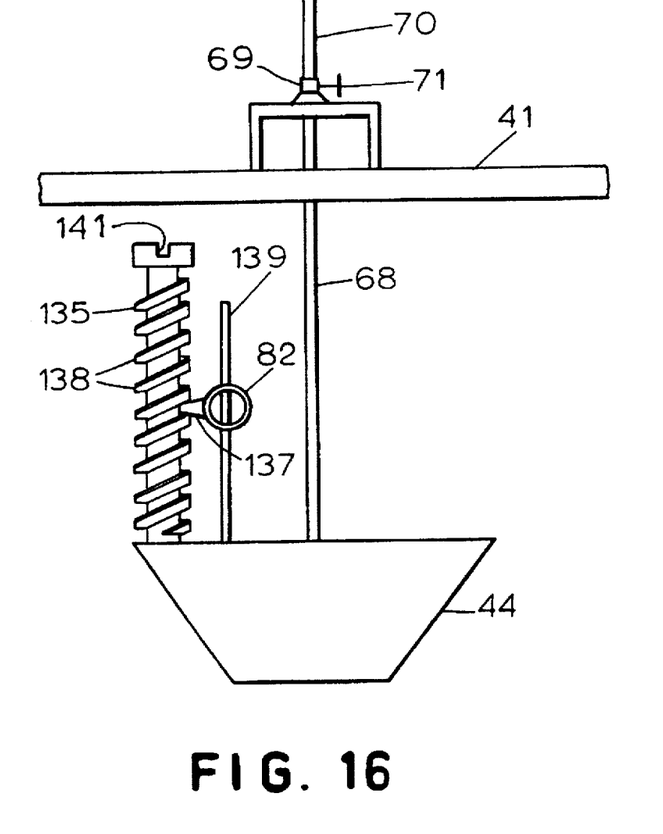
FIG. 16 is a fragmentary elevational view of an embodiment of a discharging structure in accordance with the present invention.

Alternatively, as seen in FIG. 16, a vertical screw 135 having threads 138 is rotatably attached to the concentrator 44. A rib 137 extending from the pipe 82 is slidably engaged between adjacent threads 138 of the screw 135. A support member 139 extends upwardly from the concentrator 44 through the pipe 82 to prevent axial rotation of the pipe 82.

Atop the screw 135 is a groove 141 or other suitable means for receiving a removable extension rod (not shown). An operator on the bridge 41 can raise or lower the pipe 82 by inserting the removable extension rod into the groove 141 and rotating the extension rod to cause rotation of the screw 135, thereby moving the pipe 82 vertically. The screw 135 may extend above the water level where the screw 135 is accessible to an operator and can be rotated manually or by a motor (not shown).

The operator may want to increase the distance between the pipe 82 and the concentrator 44 if it is desirable to place the concentrator 44 at a different elevation relative to the top surface of the sludge blanket 61. For example, the operator may lower the concentrator 44 further into the blanket 61 in an attempt to attain a sludge with a higher solids concentration. In embodiments discussed earlier, in which the discharging pipe 82 is immovable vertically with respect to the concentrator 44, the additive flow may have to be shut off to avoid contact between the additive and the blanket 61 while lowering the concentrator 44. With this embodiment, however, the lowering can be accomplished without shutting off the additive flow and contact between the additive and the blanket can be avoided, because the pipe 82 can first be raised to a greater vertical distance from the concentrator 44 that compensates for the subsequent lowering of the concentrator 44.

The alternative discharge structures, including those structures shown in FIGS. 6–12, can also be mounted to the concentrator 44 for movement relative to the concentrator 44. When mounted in this manner, the alternative discharge structures achieve the same advantages discussed above in connection with the embodiment having the pipe 82 including the outlets 85.

Even more preferred is an embodiment having vertical elevation adjustable during operation of the vessel 22. Examples of such embodiments are shown in FIGS. 13, 14 and 16. In the embodiments shown in FIGS. 13 and 14, the winches 117 raise or lower the pipe 82 during operation of the vessel 22. In the embodiment of FIG. 16, rotation of the screw 135 raises or lowers the pipe 82 during operation of the vessel 22. Such a vertical adjustment may be necessary when the vertical dimension of the sludge blanket 61 changes, as can occur when the flow rate of the water to be treated is changed, the temperature of the water changes during the course of a day, changes in density occur from changes in the types of solids processed, changes in the quantity of suspended solids occur, or when the treatment vessel is started up after being out of operation.

Alternative discharge structures, including those structures shown in FIGS. 6–12, can also be mounted to the concentrator 44 for movement relative to the concentrator 44 during operation of the vessel 22 as shown in FIGS. 13, 14 and 16 in connection with the pipe 82.

The direction in which the fluid additive is discharged into the water can be controlled by changing the orientation of the pipe 82 so that the discharge outlets face a particular direction. For example, if the axes of the outlets 85 of the pipe 82 are parallel to the flow of water adjacent the pipe 82, then the discharged additive will flow parallel the water flow. Discharged additive flow substantially parallel to the water flow direction is generally preferred to minimize disruption of established flow patterns in the vessel. There may be occasions when other orientations are preferred. Alternative discharge structures, such as those shown in FIGS. 6–12, can also be oriented so that the discharged additive will flow parallel to the water flow.

Figure 17:
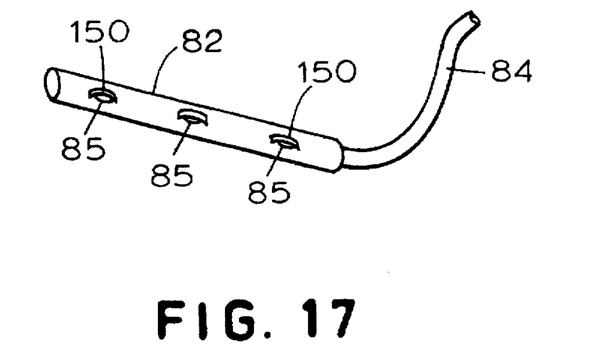
FIG. 17 is a perspective view of an embodiment of discharging structure having baffles.

In addition to or in place of orientation adjustments, the direction in which the fluid additive is discharged into the vessel may be controlled by structure for controlling discharge direction. For example, as seen in FIG. 17, baffles 150 fixed to the pipe 82 adjacent the outlets 85 can guide the additive from the outlets 85 to the water in a predetermined direction. The baffles 150 may be attached to other discharging structures previously described, and such baffles would operate similarly to the baffles 150 connected to the pipe 82.

In further embodiments, the pipe 82 is in fluid communication with apparatus for controlling the flow rate, and hence the discharge velocity, of additives to and from the pipe 82. Such apparatus may be, for example, a variable flow rate pump or other flow restricting device. By controlling the rate of flow, an operator can minimize disruption of water flow in the vessel, optimize additive concentration relative to the projected contact time at various elevations in the vessel, or switch to chemicals that require different concentrations.

By using a pipe 82 having multiple outlets 85, and by controlling flow rate and flow direction of the additive, an operator can achieve a flow rate distribution of the additive that approximates the flow rate distribution of the water adjacent the outlets 85 of the pipe 82. Although not matching the flow distribution of the water exactly, the additive only minimally disrupts the flow of the water above the sludge blanket 61 when additive flow is in proportion to the water flow. Similar control of additive flow can be accomplished with alternative discharge structures such as those shown in FIGS. 6–12.

Another aspect of the present invention is a method for discharging an additive into water in the treatment vessel 22 having the solids concentrator 44. The method includes the steps of adjusting the elevation of an outlet, such as the outlet 85, in a conduit, such as the pipe 82, relative to the clarifying vessel 22 and discharging additive from the outlet in the conduit into water in the clarifying vessel 22.

The step of adjusting the elevation of an outlet in a conduit relative to the clarifying vessel 22 may include mounting the conduit on the solids concentrator 44 and adjusting the elevation of the solids concentrator 44.

The step of discharging additive may include the step of directing the additive in a direction substantially parallel to the flow direction of water adjacent the outlet of the conduit. The step of discharging additive may alternatively or additionally include the step of controlling the flow rate of the additive to prevent disruption of water flow in the vessel 22.

The method may further comprise the step of providing a plurality of pipe branches such as the branches 105 (FIG. 9), each pipe branch 105 having an outlet such as the outlet 106 for discharging additive.

The step of discharging additive may include discharging additive from one of the following alternative structures: the porous diffuser conduit 110 (FIG. 11), the nozzle 95 (FIG. 7), the header conduit 98 having the plurality of outlets 101 (FIG. 8), and the circular pipe 107 having the tubes 108 extending radially therefrom (FIG. 10).

The method may further comprise the step of adjusting the elevation of the conduit outlet relative to the solids concentrator 44.

The foregoing detailed description has been given for clearness of understanding only, and no unnecessary limitations should be understood therefrom, as modifications will be obvious to those skilled in the art.

What is claimed is:

1. A treatment vessel comprising:
   an inlet in communication with a lower portion of the treatment vessel for introducing solids-containing water into the treatment vessel in a generally upward flow pattern to produce a blanket of sludge above the inlet and treated water above the sludge blanket;
   an outlet in communication with a top portion of the treatment vessel for receiving treated water;
   a solids concentrator disposed in the treatment vessel for removing sludge from the sludge blanket formed in the treatment vessel;
   a discharging means having an inlet for receiving additive and means for emitting additive;
   mounting means for mounting the discharging means for movement with respect to the treatment vessel; and
   means for feeding additive to the inlet of the discharging means.

2. The apparatus of claim 1 in which the means for emitting additive comprises a nozzle.

3. The apparatus of claim 1 in which the means for emitting additive comprises a header conduit defining a plurality of outlets.

4. The apparatus of claim 1 in which the means for emitting additive comprises a pipe defining an outlet.

5. The apparatus of claim 1 in which the means for emitting additive includes a branched pipe, each branch having an outlet.

6. The apparatus of claim 1 in which the means for emitting additive comprises a membrane diffuser.

7. The apparatus of claim 1 in which the means for emitting additive comprises a porous tube diffuser.

8. The apparatus of claim 1 in which the discharging means discharges the additive in a direction substantially parallel to a flow direction of water adjacent the means for emitting additive.

9. The apparatus of claim 1 wherein the mounting means is connected to the solids concentrator and the solids concentrator includes means for moving vertically relative to the treatment vessel.

10. The apparatus of claim 1 in which the mounting means is connected to the solids concentrator and includes means for adjusting the vertical distance between the solids concentrator and the discharging means.

11. A treatment vessel comprising:
    an inlet in communication with a lower portion of the treatment vessel for introducing solids-containing water into the treatment vessel in a generally upward flow pattern to produce a blanket of sludge above the inlet and treated water above the sludge blanket;
    an outlet in communication with a top portion of the treatment vessel for receiving treated water;
    a vertically adjustable solids concentrator disposed in the treatment vessel for removing sludge from the sludge blanket formed in the treatment vessel;
    a discharging means having an inlet for receiving additive and means for emitting additive, the discharging means being joined to the solids concentrator for movement therewith as conditions require; and
    means for feeding additive to the inlet of the discharging means.

12. The apparatus of claim 11 in which the means for emitting additive comprises a nozzle.

13. The apparatus of claim 11 in which the means for emitting additive comprises a header conduit defining a plurality of outlets.

14. The apparatus of claim 11 in which the means for emitting additive comprises a pipe defining an outlet.

15. The apparatus of claim 11 in which the means for emitting additive includes a branched pipe, each branch having an outlet.

16. The apparatus of claim 11 in which the means for emitting additive comprises a membrane.

17. The apparatus of claim 11 in which the means for emitting additive comprises a porous tube diffuser.

18. The apparatus of claim 11 in which the discharging means discharges the additive in a direction substantially parallel to a flow direction of water adjacent the means for emitting additive.

19. The apparatus of claim 11 and further including means for adjusting the vertical distance between the discharging means and the solids concentrator.

* * * * *